March 12, 1968

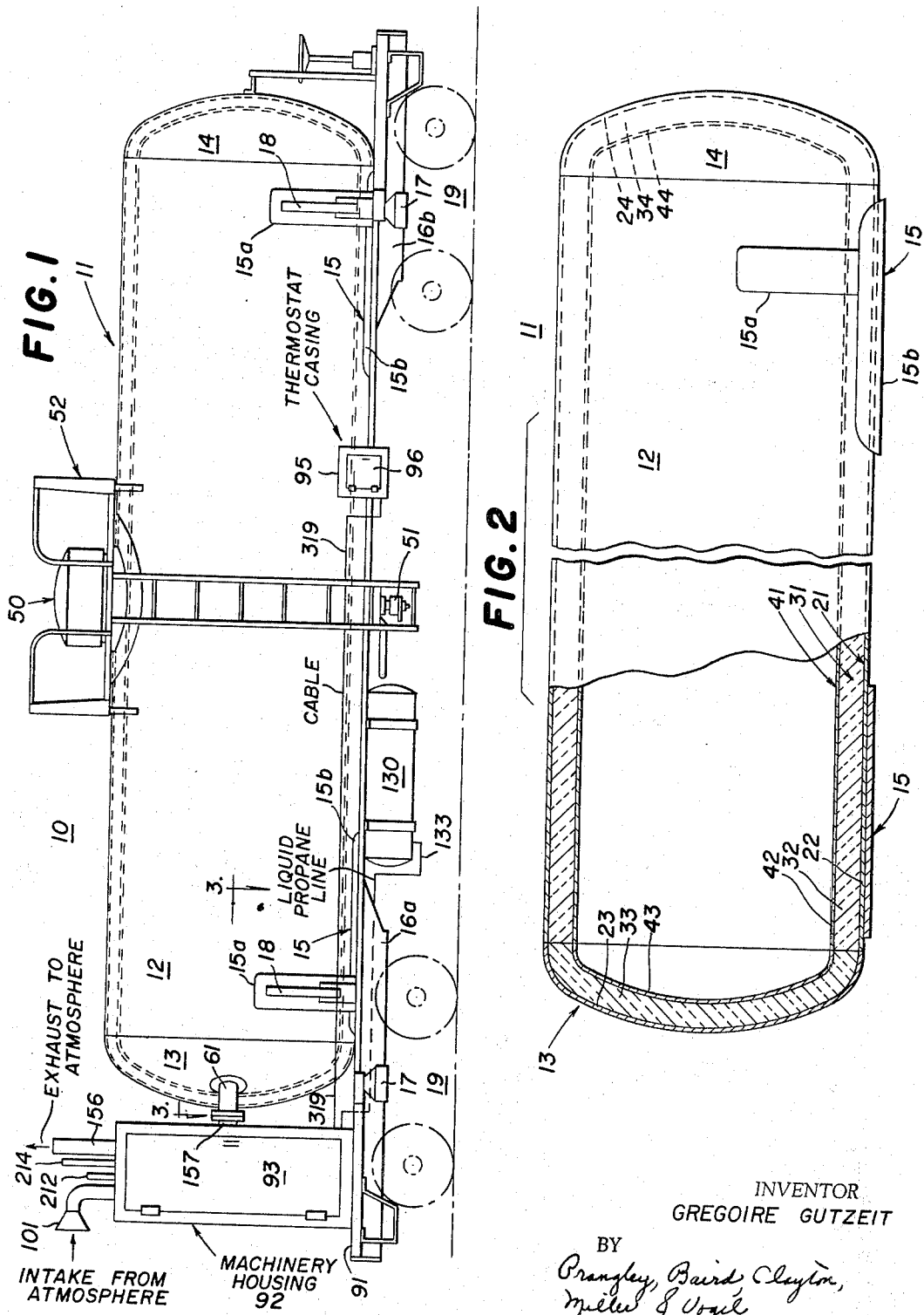

G. GUTZEIT 3,372,693

HEATING SYSTEMS AND RAILWAY TANK CARS INCORPORATING
SUCH HEATING SYSTEMS

Filed Jan. 22, 1965

INVENTOR
GREGOIRE GUTZEIT
BY
Pransley Baird Clayton,
Miller & Vogel,

ATTYS.

FIG. 6

INVENTOR
GREGOIRE GUTZEIT
BY
Prangley, Baird, Clayton,
Miller & Vogel,
ATTYS.

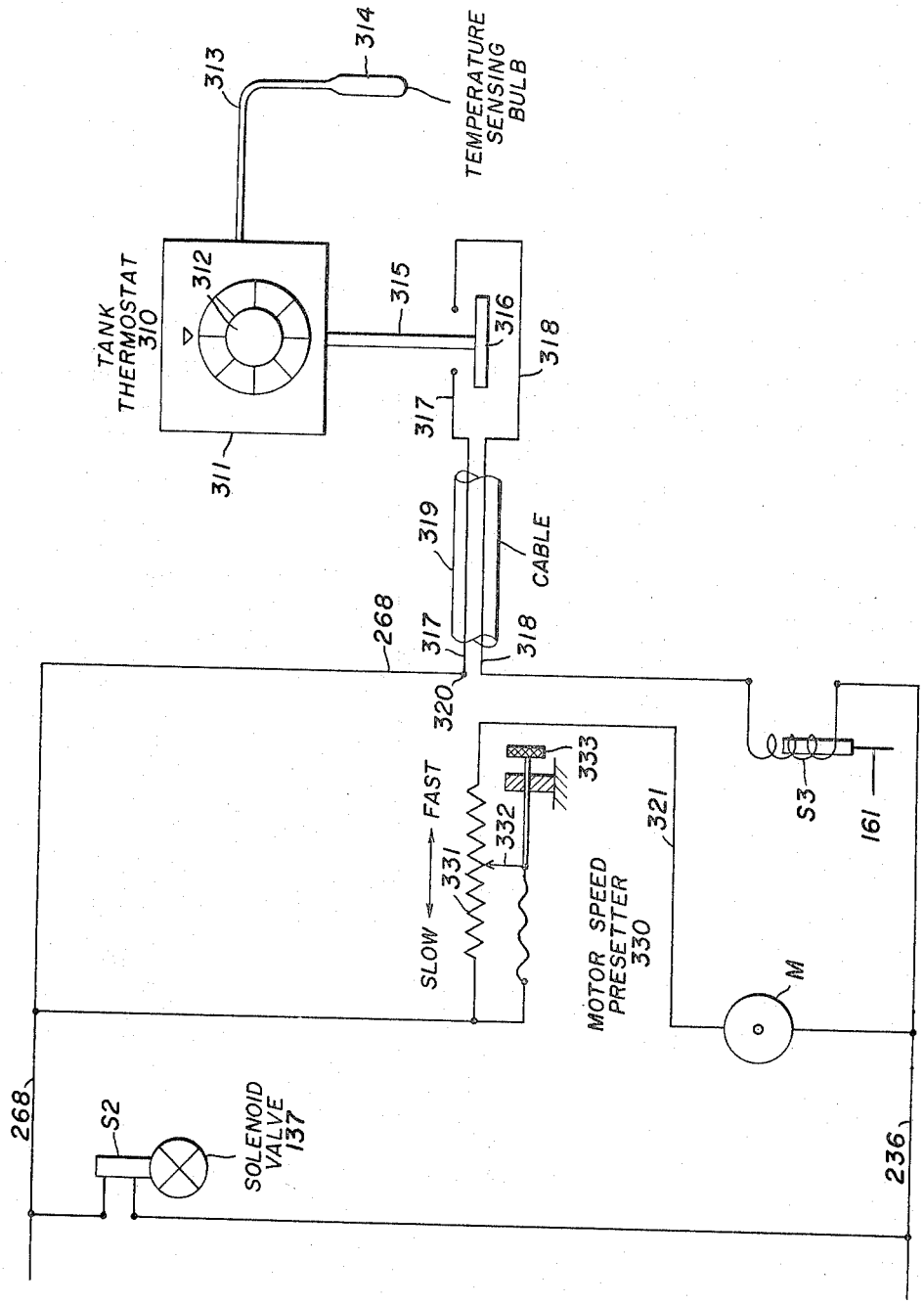

United States Patent Office 3,372,693
Patented Mar. 12, 1968

3,372,693
HEATING SYSTEMS AND RAILWAY TANK CARS INCORPORATING SUCH HEATING SYSTEMS
Gregoire Gutzeit, Highland, Ind., assignor to General American Transportation Corporation, Chicago, Ill., a corporation of New York
Continuation-in-part of application Ser. No. 311,457, Sept. 25, 1963. This application Jan. 22, 1965, Ser. No. 427,223
The portion of the term of the patent subsequent to May 31, 1983, has been disclaimed
16 Claims. (Cl. 126—343.5)

The present application constitutes a continuation-in-part of the applicant's application No. 311,457, filed Sept. 25, 1963, now Patent No. 3,291,199.

The present invention relates to improved heating systems of the general character of that disclosed in the copending application of Gregoire Gutzeit, Ser. No. 432,-179, filed Feb. 12, 1965, now Patent No. 3,253,641, issued May 31, 1966, which application constitutes a division of the copending application of Gregoire Gutzeit, Serial No. 311,457, filed Sept. 25, 1963, now Patent No. 3,291,-199, issued Dec. 13, 1966, and to railway tank cars incorporating such heating systems.

It is a general object of the invention to provide a heating system including a flameless combustion heater and incorporating a conduit system for effecting circulation of hot flue gases from the heater via a blower and then through a heating device and then back to the blower and for effecting discharge to the atmosphere of a portion of the circulated flue gases.

Another object of the invention is to provide a heating system of the character noted and further including a valve for controlling the portions of the flue gases that are respectively circulated to the heating device and discharged to the atmosphere, and a thermostatic arrangement governed by the temperature of the medium heated by the heating device for selectively governing the valve.

Another object of the invention is to provide a railway tank car comprising a heat-insulated body and a heating system for heating the liquid lading carried in the car body, wherein the heating system incorporates a combustion heater for the purpose of generating the required heat for the heating purpose noted.

Another object of the invention is to provide a railway tank car of the type comprising a rigid tank shell carrying a pair of stub draft sills at the opposite ends thereof, and having no independent underframe, and including a flameless combustion heater carried by one of the stub draft sills and positioned adjacent to one end of the tank shell and arranged to heat the liquid lading carried within the tank shell.

A further object of the invention is to provide a railway tank car comprising a body including a rigid outer shell, an intermediate layer of heat-insulating material enclosed by the outer shell, and a liner enclosed by the intermediate layer, wherein the intermediate layer is of cellular structure so that it also resiliently supports the inner liner within the outer shell and in separated and isolated relation therewith, and also incorporating an improved conduit arrangement for circulating a hot fluid from the exterior into good heat-exchange relation with the liquid lading contained in the inner liner, and wherein the intermediate layer also insulates the conduit system against the loss of heat to the outer shell.

A further object of the invention is to provide a railway tank car comprising a body, a flameless combustion heater for heating the liquid lading contained in the body, and a control circuit governed by the temperature of the liquid lading for selectively controlling the operation of the heater noted.

A still further object of the invention is to provide an improved control system and circuit in combination with a flameless combustion heater of unitary construction and arrangement.

Further features of the invention pertain to the particular arrangement of the elements of the heating system and of the railway tank car, whereby the above-outlined and additional features thereof are attained.

The invention, both as to its organization and method of operation, together with further objects and advantages thereof, will best be understood by reference to the following specification, taken in connection with the accompanying drawings, in which:

FIGURE 1 is a side elevational view of a railway tank car incorporating a heating system and embodying the present invention;

FIG. 2 is an enlarged fragmentary side elevational view partly broken away, of the body of the railway tank car, as shown in FIG. 1;

FIGS. 6 and 7, taken together, are a diagrammatic illustration of an electric control system and circuit network for the elements incorporated in the heating system, as shown in FIG. 5.

Figure 3:
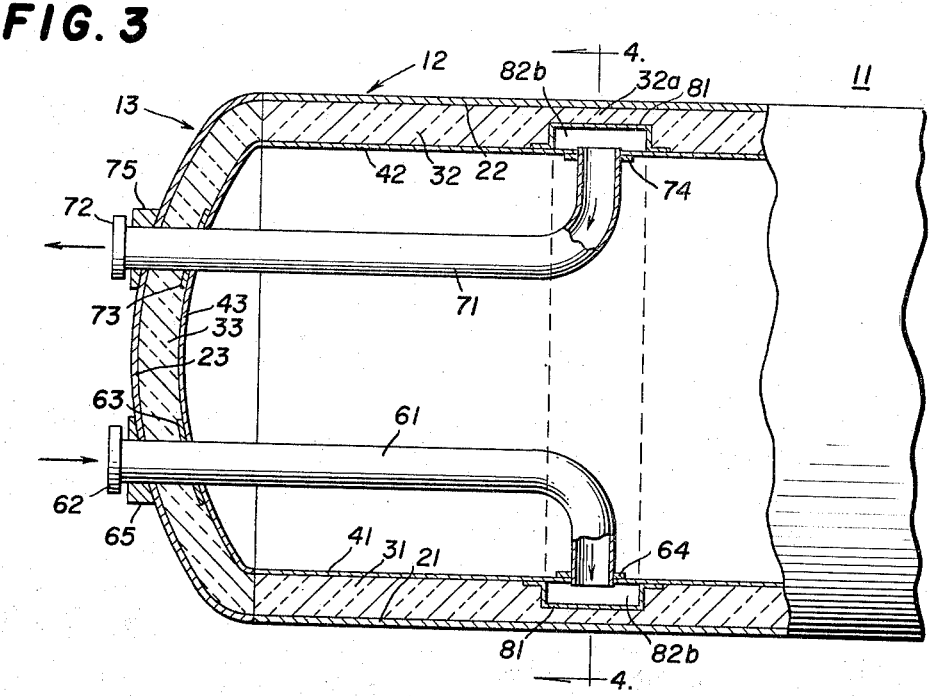
FIG. 3 is a further enlarged fragmentary plan view of the left-hand end of the body and partial horizontal sectional view thereof, as taken in the direction of the arrows along the line 3—3 in FIG. 1.

Referring now to FIGS. 1 and 2 of the drawings, the railway tank car 10 there illustrated, and embodying the features of the present invention, is of the heat-insulated type and of a construction and arrangement that does not include an underframe. More particularly, the railway tank car 10 comprises an elongated longitudinally extending body 11 that is preferably of the fundamental construction and arrangement disclosed in the copending application of Charles T. Graves, Ser. No. 325,884, filed Nov. 26, 1963, now Patent No. 3,326,141.

Specifically, the body 11 includes a tubular laminated side wall 12 disposed in a substantially horizontal position and a pair of upstanding laminated end walls 13 and 14 respectively disposed at the opposite ends of the side wall 12. The side wall 12 is substantially cylindrical; and the end walls 13 and 14 are identical, each having a generally outwardly convex or bell-like configuration. The body 11 essentially comprises an outer shell 21 of strong rigid self-supporting structure, an intermediate layer 31 of resilient cellular material completely enclosed by the outer shell 21, and an inner liner 41 of fluid-tight construction completely enclosed by the intermediate layer 31. The general configurations of the elements 21, 31 and 41 are similar; whereby the outer shell 21 is substantially uniformly spaced by the intermediate layer 31 from the inner liner 41. Thus: the outer shell 21 includes the substantially cylindrical side wall 22 and the pair of substantially bell-like end walls 23 and 24; the intermediate layer 31 includes the substantially cylindrical side wall 32 and the pair of substantially bell-like end walls 33 and 34; and the inner liner 41 includes the substantially cylindrical side wall 42 and the pair of substantially bell-like end walls 43 and 44.

The outer shell 21 is of welded construction and formed of low carbon steel; the intermediate layer 31 is of blown cellular structure and formed of a particular synthetic organic resin more fully described hereinafter; and the inner liner 41 is of welded construction and formed of low carbon steel provided with an interior plastic coating or of suitable stainless steel for various corrosive ladings, etc. Also, the interior surface of the liner 41, when formed of stainless steel, is free of all cracks and surface irregularities, and is provided with a smooth, mirror-like finish, so as to provide a surface in contact with the contained lading that may be easily maintained in a clean and sanitary condition, in order to prevent any possible contamination of the contained lading. In the construction, the outer and inner surfaces of the intermediate layer 31 are respectively intimately bonded to the inner surface of the outer shell 21 and to the outer surface of the inner liner 41. Moreover, the intermediate layer 31 has a substantial thickness, in the general range 4″ to 12″, in order completely to separate and to isolate the outer shell 21 from the inner layer 41 and resiliently to support the inner liner 41 upon the outer shell 21.

Further considering the construction of the tank car 10, it is noted that the opposite lower end portions of the side wall 22 of the outer shell 21 respectively carry two arcuate-shaped saddle plates 15 that are rigidly secured thereto, as by welding. Each of the saddle plates 15 comprises a base section 15b disposed directly below the adjacent end of the side wall 22 of the outer shell 21, and a pair of arm sections 15a respectively disposed below the opposite side portions of the adjacent end of the side wall 22 of the outer shell 21, as best shown in FIG. 2. In turn, two longitudinally extending and aligned stub draft sills 16a, 16b are respectively disposed below the base sections 15a, 15b of the saddle plates 15 and rigidly secured thereto, as by welding. In turn, the two stub draft sills 16a, 16b respectively carry two laterally extending body bolsters 17 rigidly secured thereto, as by welding; each of the body bolsters 17 carries a pair of upstanding pedestals 18 rigidly secured thereto adjacent to the opposite ends thereof, as by welding; and each of the pedestals 18 is rigidly secured to the adjacent arm section 15a of the associated saddle plate 15. Thus, each of the stub draft sills 16a or 16b is rigidly secured to the adjacent end portion of the side wall 22 of the outer shell 21 via the adjacent saddle plate 15, the adjacent body bolster 17 and the adjacent pair of pedestals 18.

The stub draft sills 16a, 16b are arranged in longitudinal alignment with each other and with the center lines thereof disposed in a vertical plane passing through the longitudinal center line of the body 11. The body bolsters 17 are respectively supported by truck bolsters respectively carried by wheeled trucks 19 respectively disposed therebelow, each of the body bolsters 17 being connected to the adjacent truck bolster by a center pin, not shown, so as to accommodate articulation of the truck 19 with respect to the associated body bolster 17 in a conventional manner. Also the outer ends of the respective stub draft sills 16a, 16b are hollow and are adapted respectively to receive conventional draft gears, not shown, in a conventional manner. In view of the foregoing description of the arrangement of the stub draft sills 16a, 16b and the associated elements it will be appreciated that the railway tank car 10 does not comprise the usual underframe; whereby the draft and buff forces are applied between the stub draft sills 16a, 16b through the side wall 22 of the outer shell 21, without the provision of an underframe or any other equivalent rigid auxiliary structure interconnecting the stub draft sills 16.

Also, the top central portion of the body 11 carries a manway structure 50; and the bottom central portion of the body 11 carries an outlet valve 51. Further, the top central portion of the body 11 carries an annular platform 52 disposed in surrounding relation with the manway structure 50; which platform 52 is preferably of the construction and arrangement of that disclosed in U.S. Patent No. 3,084,638, granted on Apr. 9, 1963, to Joseph W. Allegretti. The constructional details of the manway structure 50 and the outlet valve 51 may be of the character disclosed in the Graves application.

In the operation of the railway car 10, the inner liner 41 is adapted to receive hot ladings having temperatures as high as 300° F.; and substantial heat-loss therefrom is objectionable. Accordingly, it is essential that the resin of the intermediate layer 31 comprise a polyester-urethane resin of closed-cell structure entrapping substantial inert gas selected from the class consisting of a chlorine-fluorine substituted alkane; whereby this resin has a K-factor at least as low as about 0.15 B.t.u./in./sq. ft./hr./° F. in order to heat-insulate from each other the outer shell 21 and the inner liner 41. Reverting to the inert gases specified, this class of compounds comprises $CHClF_2$, $CCl_2F_2$, $CCl_3F$, $C_2Cl_2F_4$ and $C_2Cl_3F_3$; and of these gases $CCl_3F$ and $CCl_2F_2$ are normally preferred as a matter of efficiency and economy. The utilization of these inert gases as the blowing agent is very important since a typical polyester-urethane resin blown with $CCl_3F$ has a K-factor as low as about 0.122, while a comparable typical polyester-urethane resin blown with $CO_2$ has a K-factor of about 0.191. For reference purposes it is noted that a comparable cellular polystyrene resin has a K-factor of about 0.220.

The utilization of a polyester-urethane resin, instead of a polyether-urethane resin, is very important, since the chemical stability of the polyester-urethane resin is much greater than the polyether-urethane resin; particularly, when the resin is subject to a temperature higher than about 150° F. In this regard, it is mentioned that at temperatures above about 200° F., the polyester-urethane resin is altogether stable, while the polyether-urethane resin undergoes substantial damage by decomposition.

Again reverting to FIG. 2, it is noted that the end walls 33 and 34 of the intermediate layer 31 have a relatively high density of at least about 5 pounds/cu. ft., while the side wall 32 of the intermediate layer 31 has a relatively low density of about 2 pounds/cu. ft.; whereby the high density resin has a yield strength of about 80 lbs./sq. in., while the low density resin has a yield strength of about 15 lbs./sq. in. This arrangement is very advantageous, since the high density resin of the end walls 33 and 34 of the intermediate layer 31 enable the same to withstand the great forces to which they are subjected by the respective end walls 43 and 44 of the inner liner 41 incident to impact conditions of the lading contained in the inner liner 41, as a result of coupling of the railway tank car 10 in a train, etc. Also, the utilization of polyester-urethane resin, as distinguished from polyether-urethane resin, is advantageous from the standpoint that the polyester-urethane resin has a higher yield strength than the polyether-urethane resin, employing resins of comparable density.

The following example of a polyester-urethane resin of cellular form and of closed-cell structure and blown by an inert gas of the class specified is recommended for the production of the side wall 32 of the intermediate layer 31. This resin is produced by a machine comprising tanks A and B respectively containing two portions of the ingredients, as noted below. The contents of tank A are maintained at a temperature of about 70° F. and the contents of tank B are maintained at a temperature of about 190° F.; the contents of the two tanks are mixed at a rate of about 5500 r.p.m. and in about equal parts by weight and immediately applied to the mold.

Tank A contains the ingredients in parts by weight:

27 parts—trichloromonofluoromethane "Freon–11" (Du Pont)

71¾ parts—tolylene diisocyanate "70 Nacconate 4040" (Allied Chemical)

1¼ parts—silicone compound "L530" (Union Carbide)

Tank B contains the ingredients in parts by weight:

100 parts—chlorinated polyester "Hetrafoam 250" (Durez Plastics)

In tank A the trichloromonofluoromethane is a propellant and blowing agent, and the silicone compound is an agent for controlling the cell structure of the cured polyester-urethane resin; and in tank B the chlorination of the polyester renders the cured polyester-urethane resin flame self-quenching. This polyester in tank B essentially comprises the basic reaction product of maleic anhydride and phthalic anhydride with propylene glycol; a typical formula comprising 0.5 mole maleic anhydride, 0.5 mole phthalic anhydride, and 1.1 moles of propylene glycol. A small amount of cobalt naphthenate, as an accelerator, and a small amount of methyl ethyl ketone peroxide, as a catalyst, may also be added to the basic ingredients named above for the fundamental purpose of controlling the degree of prepolymerization thereof in the production of this linear polyester. Also, the chlorination of this linear polyester is normally carried out subsequent to the prepolymerization mentioned and may be omitted if the flame self-quenching characteristic noted is not desired in the ultimately produced polyester-urethane resin. However, this characteristic is highly desirable, as it increases the safety factor of the resin and contributes to chemical stability thereof when it is subjected to relatively high temperatures.

This blown polyester-urethane resin after curing has a density of about 2 pounds/cu. ft., as previously noted.

Now, in order to produce the blown polyester-urethane resin having a density of about 5 pounds/cu. ft., for the production of the end walls 33 and 34 of the intermediate layer 31, it is only necessary to decrease the proportion of ingredients taken from tank A in the mixture; whereby the contents of the two tanks A and B are mixed in this case in the ratio of approximately 40% :60% by weight and at a rate of about 5500 r.p.m. and immediately applied to the mold. It is the decreased amount of trichloromonofluoromethane in this mix that produces a decreased porosity in the cured polyester-urethane resin, causing the same to be of higher density and of greater rigidity, with respect to the cured polyester-urethane resin first described.

The foregoing examples of the chemistry of the polyester-urethane resin are well known within themselves; whereby these formulations have been set forth herein only by way of examples, so as positively to insure that the corresponding resins incorporated in the railway tank car 10 possess the desired chemical and physical properties that are required therein, as previously explained in conjunction with the construction and arrangement thereof. Thus, it will be readily apparent that other chemical formulations of these polyester-urethane resins may be substituted in the railway tank car 10.

In the operation of the railway tank car 10, it is contemplated that the inner liner 41 will be loaded through the manway structure 50 and will be unloaded through the outlet valve structure 51. Also, it is noted that the intermediate layer 31 is quite resilient, thereby to protect the inner liner 41 against the transmission of vibration and shock thereto incident to operation of the railway tank car 10. Not only do the end walls 33 and 34 of the intermediate layer 31 offer protection to the inner liner 41 against undue longitudinal shifting within the outer shell 21, but the side wall 32 of the intermediate layer 31 also offers such protection to the inner liner 41, since the side wall 32 of the intermediate layer 31 is subjected to shear stresses incident to such longitudinal shifting of the inner liner 41, so that the same resiliently opposes such shifting. This effect is produced by virtue of the intimate bonding of the intermediate layer 31 throughout the internal surface thereof to the adjacent external surface of the inner liner 41 and the intimate bonding of the intermediate layer 31 throughout the external surface thereof to the adjacent internal surface of the outer shell 21. Specifically, the side wall 32 of the intermediate layer 31 of the composition heretofore specified has an ultimate shear strength of about 26 p.s.i., and an ultimate tensile strength of about 54 p.s.i.; whereby the inner liner 41 is capable of carrying safely quite dense ladings without danger of pulling the inner liner 41 loose from the intermediate layer 31 or pulling the intermediate layer 41 lose from the outer shell 21, particular at the top surfaces thereof that are subjected to tensile stresses, when the inner liner 41 is loaded.

Figure 4:
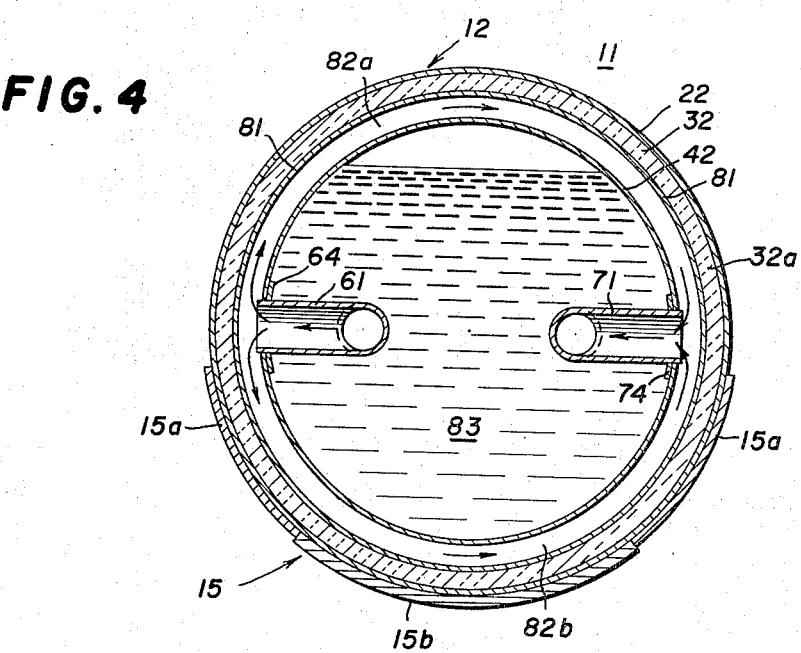
FIG. 4 is a further enlarged vertical sectional view of the body, as taken in the direction of the arrows along the line 4—4 in FIG. 3.

In accordance with the present invention, the body 11 further comprises, as best shown in FIGS. 3 and 4, a heating conduit system, including two tubular conduits 61 and 71, projecting through two sets of aligned openings respectively formed in the elements 23, 33 and 43 of the end wall 13. The outer ends of the conduits 61 and 71 respectively terminate in flanged couplings 62 and 72; the intermediate portions of the conduits 61 and 71 respectively produce elbow connections to the inner ends thereof; and the inner ends of the conduits 61 and 71 respectively terminate in two openings provided in the opposite sides of the side wall 42 of the inner liner 41. The sections of the end wall 43 of the inner liner 41 through which the conduits 61 and 71 project are reinforced by surrounding annular plates 63 and 73 that are respectively rigidly secured to the conduits 61 and 71 and to the adjacent portions of the end wall 43, so as to seal the openings in the end wall 43 and to render the liner 41 fluid-tight. Similarly, the sections of the side wall 42 of the inner liner 41 through which the conduits 61 and 71 project are reinforced by surrounding annular plates 64 and 74 that are respectively rigidly secured to the conduits 61 and 71 to the adjacent portions of the side wall 42, so as to seal the openings in the side wall 42 and to render the liner 41 fluid-tight. On the other hand, the sections of the end wall 23 of the outer shell 21 through which the conduits 61 and 71 project are reinforced by surrounding annular bushings 65 and 75 that are rigidly secured to the adjacent portions of the end wall 22 and that slidably support the respective conduits 61 and 71. Thus the conduits 61 and 71 are rigidly secured to and supported by the inner liner 41 and move therewith upon the resilient intermediate layer 31 and with respect to the outer shell 21, the longitudinal movements of the conduits 61 and 71 being accommodated by the bushings 65 and 75 that also serve as guides for such longitudinal movements of the conduits 61 and 71. The left-hand end of the side will 42 of the inner liner 41 carries an annular ring-like structure 81 on the exterior surface thereof and positioned intermediate the inner liner 41 and the outer shell 21 and surrounding the inner ends of the conduits 61 and 71. The structure 81 has a channel-like cross section and is secured, as by welding in fluid-tight relation with the outer surface of the side wall 42 of the inner liner 41 and defining a tubular passage 82a, 82b surrounding the side wall 42 of the inner liner 41 and communicating with the open inner ends of the conduits 61 and 71. The structure 81 is spaced radially inwardly with respect to the side wall 22 of the outer shell 21 with an annular section 32a of the side wall 32 of the intermediate layer 31 disposed in surounding relation therewith and heat-insulating the structure 81 from the side wall 22 of the outer shell 21.

In the arrangement: the conduit 61 constitutes an inlet conduit and the conduit 71 constitutes an outlet conduit; and the inner end of the inlet conduit 61 is connected by the upper and lower passage sections 82a and 82b to the inner end of the outlet conduit 71. Normally, the intermediate portions of the conduits 61 and 71 are submerged in the liquid lading, indicated at 83 in FIG. 4, that is contained in the inner liner 41, while the pasasge 82a, 82b surrounds the side wall 42 of the inner liner 41; whereby the conduits 61 and 71, as well as the passage 82a, 82b, are disposed in god heat-exchange relation with the liquid lading 83. Accordingly, the flow of a hot fluid through the conduits 61 and 71 and through the passage 82a, 82b effects heating of the liquid lading 83 in an obvious manner.

Also, a propeller, or other liquid lading circulating device, not shown, may be arranged in the inner liner 41, so as to insure circulation of the liquid lading through the inner liner 41, and particularly through the left-hand end thereof and into contact with the conduits 61 and 71, thereby to maintain a substantially uniform temperature of the liquid lading 83 throughout the volume thereof, and in an obvious manner.

As indicated in FIG. 1, the stub draft sill 16a disposed at the left-hand end of the body 11 is somewhat longer than the stub draft sill 16b disposed at the right-hand end of the body 11; and the top outer end of the stub draft 16a carries a platform 91 upon which there is mounted an upstanding housing 92 disposed adjacent to the end wall 13 of the body 11. The housing 92 is provided with a side door 93; and arranged within the housing 92 are the principal components of the heating system incorporated in the railway tank car 10.

Figure 5:
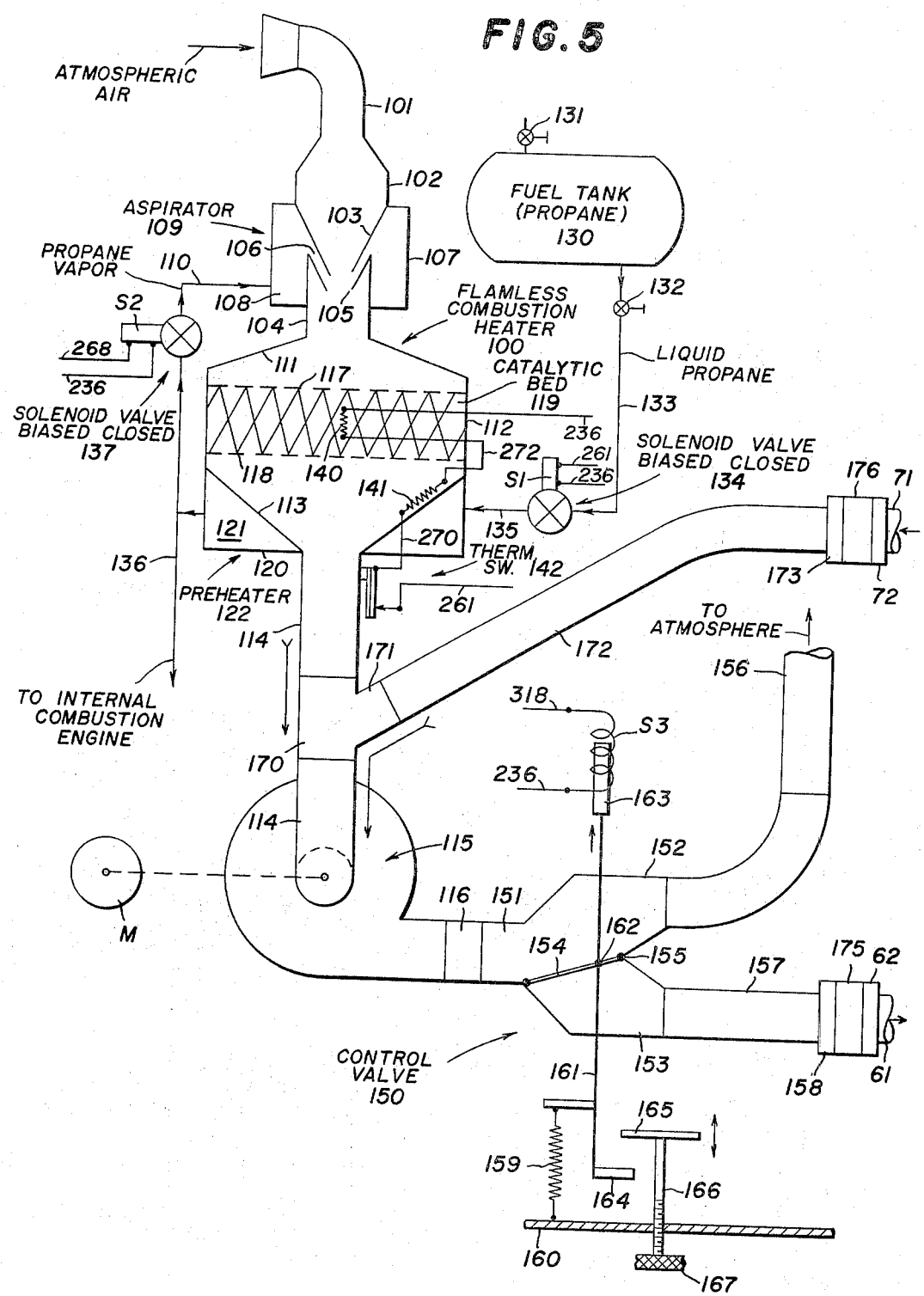
FIG. 5 is a diagrammatic illustration of a flameless combustion heater and the portion of the heating system that is disposed exteriorly of the body.

Referring now to FIG. 5, the heating system there illustrated, and embodying the features of the present invention, comprises a flameless combustion heater 100 that is preferably of the general construction and arrangement of that disclosed in the Gutzeit application. More particularly, the flameless combustion heater 100 is of the catalytic type and comprises an upstanding substantially cylindrical tube 101, the upper end of which is in open communication with the atmosphere and constitutes an adit for atmospheric air, and the lower end of which flares outwardly to join the upper end of an adjacent enlarged upstanding substantially cylindrical tube 102. The lower end of the tube 102 joins the upper end of an adjacent upstanding downwardly converging funnel 103, the lower end of which is open and constitutes an exit for the air. An upstanding substantially cylindrical tube 104 is arranged below and in alignment with the funnel 103; and the upper end of the tube 104 carries therein an upstanding downwardly converging funnel 105. The funnel 103 is arranged in spaced relation immediately above the funnel 105 and in alignment therewith, so that the bottom opening from the funnel 103 directs the air stream into the bottom opening in the funnel 105, and so that a narrow annular throat or space 106 is defined between the funnels 103 and 105 and communicating between the exterior of the funnels 103 and 105 and the interior of the tube 104. Further, the upper portion of the funnel 103 and the upper portion of the tube 104 are joined together by an upstanding substantially drum-like casing 107 defining an annular chamber 108 surrounding the other annular portion of the throat 106. The structure 103, 105, 107 defines an aspirator, denoted as 109; whereby it will be understood that when a stream of air is directed from the tube 102 through the funnels 103 and 105 into the tube 104 the high velocity of the air passing through the openings in the funnels 103 and 105 creates a low pressure or venturi effect in the inner annular portion of the throat 106, with the result that vapor present in the chamber 108, is drawn therefrom through the throat 106 and into the air stream passing through the openings in the funnels 103 and 105 and is thus projected therewith into the upper end of the tube 104. At this point, it is noted that propane vapor is supplied via a pipe 110 into the chamber 108; whereby the aspirator 109 effects the injecion of this vapor into the previously noted air stream, so as to produce a gaseous mixture of propane vapor and air passing through the tube 104, this gaseous mixture constituting a combustible mixture of the combustible substance, propane, and air, and employed for a purpose explained below.

The lower end of the tube 104 is connected by a downwardly flared and diverging annular wall 111 to the upper end of an enlarged upstanding substantially cylindrical wall 112; and the lower end of the wall 112 is connected by a downwardly flared and converging annular wall 113 to the upper end of an aligned upstanding tube 114. Also, the heater 100 comprises a blower 115 provides with a casing having an inlet connected to the lower end of the tube 114 and an outlet connected to a conduit 116. The casing of the blower 115 houses rotor structure, not shown, that is driven by an associated electric motor M.

Arranged within the cylindrical wall 112 are upper and lower foraminous screens 117 and 118 defining an annular space therebetween and containing a corresponding annular porous bed 119 of catalytic material that is characterized by the production of flameless catalytic combustion of the combustible mixture in passing therethrough with the consequent production of hot flue gases passing from the bed 119 via the tube 114 and thence into the casing of the blower 115 and ultimately through the conduit 116. Also, annular structure 120 is arranged in surrounding relation with the annular wall 113 and connected thereto and cooperating therewith to define an annular chamber 121 therebetween; which structural arrangement constitutes a preheater, denoted as 122.

Further, the heater 100 comprises a fuel tank 130 that is adapted to contain a body of liquid fuel, such as propane. The tank 130 comprises a valve-controlled charging inlet 131 and a valve-controlled supply outlet 132. In turn, the supply outlet 132 is connected via a pipe 133 to a solenoid valve 134; and the valve 134 is connected via a pipe 135 to the preheater 122. The preheater 122 is also connected to a pipe 136; and a solenoid valve 137 interconnects the pipes 136 and 110. Further, an electric heating unit 140 is embedded in the central portion of the catalytic bed 119 in good heat-exchange relation therewith; an electric heating unit 141 is arranged in good heat-exchange relation with the preheater 122; and a thermal switch 142 is arranged in good heat-exchange relation with the tube 114. The thermal switch 142 occupies its closed position when the tube 114 is cold; and a circuit is provided for energizing the electric heating units 140 and 141 in series relation with each other and via the thermal switch 142.

Considering now the overall operation of the flameless combustion heater 100, it is first assumed that the catalytic bed 119 is hot, that the solenoids S1 and S2 of the respective valves 134 and 137 are energized to open the valves, that the motor M is operating, and that the thermal switch 141 has responded to a hot condition of the tube 114 to denergize the electric heating units 140 and 141. Liquid propane is supplied from the tank 130 via the elements 132, 133, 134 and 135 into the hot preheater 122, so that it is flashed to vapor; whereby the propane vapor is supplied from the preheater 122 via the elements 136, 137 and 110 to the aspirator 109, so that it fills the chamber 108 communicating with the throat 106. Operation of the blower 115 effects the drawing of atmospheric air into the open upper end of the tube 101 and flow of the air stream through the elements 101, 102, 103 and 105 into the tube 104. The high velocity of the air stream through the openings in the funnels 103 and 105 creates a low pressure area in the inner portion of the throat 106, with the result that the propane vapor in the chamber 108 of the aspirator 109 flows therefrom through the throat 106 and into the air stream passing through the openings in the funnels 103 and 105; whereby a combustible mixture of the propane vapor and the air is produced and projected in a stream through the tube 104 and then passes into the porous catalytic bed 119. In passing through the porous catalytic bed 119, the mixture undergoes flameless catalytic combustion, as distinguished from open-flame burning, with the consequence production of heat and flue gases consisting essentially of carbon dioxide and water vapor. The catalytic bed 119 is thus maintained in a hot condition, and the hot flue gases are drawn through the tube 114 into the blower 115. In the blower 115 the hot flue gases undergo compression and are forced or blown through the conduit 116.

In order to initiate operation of the catalytic action of the catalytic bed 119, it is necessary to preheat the same; and when it is cold or under temperature, this is accomplished by completing the electric circuit for energizing the electric heating unit 140 (as well as the heating unit 141) via the thermal switch 142 in its closed position. The electric heating unit 140 develops a "hot spot" in the catalytic bed 119, whereby the catalytic action described above takes place thereat when the combustible mixture is passed through the catalytic bed 119; whereby this local catalytic action heats the adjacent portions of the catalytic bed 119, with the result that the catalytic action rapidly grows in the catalytic bed 119 soon producing complete catalytic action uniformly throughout the catalytic bed 119, the hot flue gases produced cause heating of the tube 114, whereby the thermal switch 142 responds to effect interruption of the electric circuit for energizing the electric heating unit 140. Of course, the continued operation of the flameless combustion heater 100 maintains the catalytic bed 119 thereof in a hot catalytically active condition in an obvious manner.

Simultaneously, with initiation of operation of the catalytic action of the catalytic bed 119, as described above, operation of the preheater 122 is initiated, since the series circuit for energizing the electric heating units 140 and 141 is completed and subsequently interrupted by the thermal switch 142. Thus, the preheater 122 is heated by the heating unit 141 to initiate operation thereof simultaneously with the heating of the catalytic bed 119 by the heating unit 140.

In the construction of the flameless combustion heater 100, it is particularly advantageous to form the foraminous screens 117 and 118 and the tube 112 that contact the catalytic bed 119, of stainless steel; likewise, if costs permit, the elements 101, 102, 103, 104, 105, 107, 111, 113, 120 and 114 may also be formed of stainless steel.

Considering now in some detail the catalytic bed 119, the same may comprise a number of available materials, such for example as the catalyst described in British Patent No. 862,771, published Mar. 15, 1961, granted to Johann H. Helberger, and consisting essentially of the chromium (IV and V) oxides, the black oxides as distinguished from the chrome green oxide $Cr_2O_3$. While the Helberger catalyst is entirely suitable for the present purpose, the same has the undesirable operating characteristic that these higher chromium oxides decompose at 400° C., to the chrome green oxide $Cr_2O_3$; whereby the catalytic action is so greatly reduced that it is not possible further to effect flameless catalytic combustion of the propane-air mixture in the catalytic bed. Also, the threshold temperature to initiate such flameless catalytic combustion of this mixture is in the general temperature range 200° C. to 230° C.; whereby the operating temperature range of the catalytic bed must be confined to the range from about 250° C. to about 350° C.

Accordingly, the improved catalytic elements disclosed and claimed in the copending application of Pranas Budininkas, Ser. No. 307,805, filed Sept. 10, 1963, now abandoned, are especially recommended for use in the catalytic bed 119 of the flameless combustion heater 100, since the Budininkas catalytic elements do not undergo decomposition until the temperature of 650° C. is reached; whereby the operating temperature range of the catalytic bed may embrace the broad range from about 250° C. to about 600° C., thereby lending great stability and latitude in the operation of the catalytic bed 119 of the flameless combustion heater 100.

More particularly, a preferred example of the Budininkas catalytic element comprises a porous structure having an effective surface of large area, the structure consisting essentially of a bead of activated alumina, and a catalyst supported in a thin layer by the effective surface of the structure and having a corresponding surface of large area, the catalyst consisting essentially of chromium (IV and V) oxides and being substantially free of chromium (III and VI) oxides and being characterized in the supported condition by chemical stability at temperatures up to 600° C. (actually up to about 650° C.).

Such preferred example of the Budininkas catalytic element may be manufactured, in accordance with the preferred Budininkas method, by soaking the porous structure described in an aqueous solution, containing about 43% to 50% $CrO_3$ by weight, followed by draining of excess of the solution from the structure, and then by heating the soaked structure at a temperature of about 600° C., during a time interval of at least about 2 hours.

Of course, a catalytic bed of the Budininkas catalytic elements is not only porous in the general sense that the mixture may readily penetrate the bed via the interstices therein, but the individual catalytic elements are also porous to the passage of the mixture therethrough.

In the operation of the flameless combustion heater 100, it is advantageous to supply air in the amount of about 1.8 times the stoichiometric amount to effect complete or total combustion of the propane vapor; which ratio of propane vapor to air in the mixture passing into the tube 104 is maintained substantially constant by virtue of the automatic action or operation of the aspirator 109. Thus, in the event of an increase in the rate of flow of the air into the tube 101, there is an increase in the velocity of the air through the openings in the funnels 103 and 105, whereby a lower pressure appears in the inner portion of the throat 106, so as to increase the rate of flow of the propane vapor through the throat 106, so as to maintain substantially constant the ratio between the volume of propane vapor and the volume of air in the mixture passing through the tube 104. Also, as the volume of the mixture passing through the tube 104 is thus increased, the temperature of the catalytic bed 119 is correspondingly increased within the operating temperature range thereof and the volume of the flue gases is correspondingly increased. The increased volume of the flue gases in the tube 114 increases the load on the blower 115, whereby its drive motor M tends to slow down, with the result that the pressure differential across the catalytic bed 119 is reduced, causing an increased pressure in the tube 104, so as to reduce the rate of flow of the air into the tube 101. Thus, the actions of the aspirator 109, the catalytic bed 119 and the blower 115 coact to produce a substantially constant temperature of the catalytic bed 119, within its operating temperature range, and to produce a substantially constant volume of the hot flue gases passing through the conduit 116. Thus, the rating or heating capacity of the flameless combustion heater 100 in B.t.u./hour is substantially constant.

In order to vary the heating capacity of the flameless combustion heater 100, it is only necessary to vary the gas-handling capacity of the blower 115; which may be effected in a ready manner by correspondingly varying the speed of the drive motor M. Specifically, an increase in the speed of the drive motor M causes the blower 115 to increase the differential pressure across the catalytic bed 119, which results in a high operating temperature thereof, and the consequent production of flue gases at a higher rate; whereby the production rate of flue gases is increased and the temperature thereof is increased, so as to increase in an obvious manner the B.t.u./hour that are delivered from the flameless combustion heater 100 into the conduit 116.

Further, the heating system comprises a control valve 150 including a casing provided with an inlet 151 and two outlets 152 and 153, as well as a gate 154 pivoted at 155 and movable between a position closing the outlet 153 and a position opening both of the outlets 152 and 153. The inlet 151 is connected to the conduit 116 extending from the blower 115; the outlet 152 is connected to a stack 156 communicating with the atmosphere; and the outlet 153 is connected to a conduit 157 terminating in a flanged coupling 158. The gate 154 is normally biased into its position closing the outlet 153 by a coil spring 159 connected between a base plate 160 and an operating rod 161 that is pivotally connected to the gate 154, as indicated at 162. The upper end of the rod 161 carries an armature 163 that is operatively associated with a solenoid S3. When the solenoid S3 is energized, the rod 161 is raised against the bias of the coil spring 159 to cause the gate 154 to open the outlet 153 and to at least partially close the outlet 152. More particularly, the lower end of the rod 161 carries a stop 164 that cooperates with a stop 165 carried by the upper end of a threaded member 166 arranged in a threaded opening provided in the base plate 160; and the lower end of the member 166 carries a knurled handwheel 167. Thus, selective rotation of the handwheel 167 effects corresponding vertical movement of the member 166 and the consequent vertical adjustment of the stop 165 with respect to the stop 164, thereby to vary the upward movement of the gate 150 toward full closure of the outlet 152 in response to energization of the solenoid S3 which may be adjusted in an obvious manner.

Arranged in the intermediate section of the conduit 114 is a Y-conduit 170 having a side arm 171 that is connected to a conduit 172 that terminates in a flanged coupling 173. The flanged coupling 62 terminating the inlet conduit 61 extending to the body 11 is connected to the flanged coupling 158 terminating the conduit 157 by a resilient coupling unit 175; and similarly, the flanged coupling 72 terminating the outlet conduit 71 extending from the body 11 is connected to the flanged coupling 173 terminating the conduit 172 by a resilient coupling unit 176. The coupling units 175 and 176 accommodate limited movements of the respective flanged couplings 62 and 72 with respect to the respective flanged couplings 158 and 173; which movements of the flanged couplings 62 and 72 result from the circumstance that the conduits 61 and 71 move with the inner liner 41 and with respect to the outer shell 21 in the body 11, as previously explained.

Considering now the overall mode of operation of the heating system when the heater 100 is operating, the hot flue gases are discharged by the blower 115 via the conduit 116 into the control valve 150. In the event the valve gate 154 occupies its down position illustrated in FIG. 5, the hot flue gases are discharged from the control valve outlet 152 into the stack 156 and thence to the atmosphere. In the event the valve gate 154 occupies its up position, a main body of the flue gases is discharged from the control valve outlet 153 via the elements 157, 158, 175 and 62 into the inlet conduit 61. From the inlet conduit 61 the hot flue gases flow through the heating passage 82a, 82b in the body 11 and thence into the outlet conduit 71. From the outlet conduit 71 the hot flue gases flow via the elements 72, 176, 173, 172, 171 and 170 back into the conduit 114 and thence into the inlet of the blower 115 for discharge into the conduit 116 and delivery to the control valve 150. Also, in this case, an auxiliary body of the hot flue gases is discharged from the control valve outlet 152 via the stack 156 to the atmosphere. Thus, when the valve gate 154 occupies its up position, the hot flue gases are both recirculated by the blower 115 through the body 11 and discharged by the blower 115 through the stack 156 to the atmosphere. The discharge of a portion of the hot flue gases via the stack 156 to the atmosphere is necessary to avoid undesirable build-up of hot flue gases in the circulating system, since new hot flue gases from the heater 100 are constantly added to the circulating system by the operation of the blower 115, as previously explained. The arrangement is very advantageous, since it insures a substantial circulation of the hot flue gases through the body 11 and proper heating of the liquid lading contained in the inner liner 41 thereof.

Turning now to the control circuit and system for the flameless combustion heater 100, and referring to FIGS. 6 and 7, the same comprises an internal combustion engine 210 of any conventional type that is operative upon propane vapor. The engine 210 is provided with a carburetor 211 that is connected to the vapor line 136 extending from the preheater 122 forming a part of the flameless combustion heater 100, as previously described. The carburetor 211 is also provided with a fresh air intake 212 and the resulting mixture is delivered to the cylinders of the engine 210 via a manifold, as indicated at 213. The exhaust gases from the cylinders of the engine pass via an exhaust manifold, indicated at 214, to the atmosphere. Also, the engine 210 comprises a conventional ignition system, indicated at 215, and a drive shaft, indicated at 216. An electric generator, or dynamo, 220 is connected to the drive shaft 216 and provided with a field coil 221; and similarly, an electric start motor 225 is connected to the drive shaft 216 and provided with a field coil 226. Also, a speed responsive device 230 is connected to the drive shaft 216 and provided with two contact bridging members 231 and 232.

Also, the control circuit comprises a manually operable start button 233, a manually operable stop button 234, a storage battery 235 bridged across a grounded −bus 236 and an ungrounded +bus 237, an engine relay 240, a thermal time delay relay 245, and a burner relay 250. The start button 233 controls two contacts respectively terminating the bus 237 and a conductor 261. The stop button 234 controls two contacts respectively terminating a conductor 262 and the bus 236. The contact bridging member 231 controls a pair of back contacts respectively terminating a conductor 263 and the conductor 261. Also, the contact bridging member 231 controls a pair of front contacts respectively terminating a conductor 264 and the conductor 261. The contact bridging member 232 controls a pair of front contacts respectively terminating a conductor 265 and the conductor 261. The armature of the generator 220 is bridged across the bus 236 and a conductor 269; and the field coil 221 of the generator 220 is bridged across the bus 236 and a conductor 266. The armature of the start motor 225 is connected between the conductor 263 and one terminal of the field coil 226 thereof; and the other terminal of the field coil 226 is connected to the bus 236. The supply terminals of the ignition system are respectively connected to the conductor 261 and to the bus 236. The winding of the engine relay 240 is bridged across the conductors 262 and 261; and the engine relay 240 comprises a first contact bridging member 241 controlling a pair of contacts respectively terminating the bus 237 and the conductor 261, and a second contact bridging member 242 controlling a pair of contacts respectively terminating the conductors 269 and 264. The time delay relay 245 comprises a heater 246 bridged across the conductor 265 and the bus 236, a bimetallic member 247 and a switch spring 248. The base of the bimetallic member 247 is connected to the conductor 265; and the base of the switch spring 248 is connected to a conductor 267. The winding of the burner relay 250 is bridged across the conductor 267 and the bus 236; and the burner relay 250 comprises a contact bridging member 251 controlling a pair of contacts respectively terminating the conductor 265 and a conductor 268. The thermal switch 142 includes a metallic member 269 connected to a conductor 270, and a switch spring 271 connected to the conductor 261. The conductor 270 is connected to one terminal of the electric heating unit 141; the other terminal of the unit 141 is connected via a conductor 272 to one terminal of the electric heating unit 140; and the other terminal of the unit 140 is connected to the bus 236. The solenoid S1 of the valve 134 is bridged across the conductor 261 and the bus 236.

Moreover, the control circuit comprises a conventional voltage regulator 280 bridged across the conductor 261 and the bus 236; which regulator 280 adjusts a slide contact 281 connected to the conductor 261 and cooperating with a variable resistor 282 connected to the conductor 266. Further, the control circuit comprises a tank thermostat 310 and a motor speed presetter 330.

The tank thermostat 310 includes a casing 311 housing conventional mechanism that is operatively connected to a manually operable temperature presetting dial 312 and to a capillary tube 313 that terminates in a temperature sensing bulb 314, the bulb 314 being submerged in the liquid lading 83 contained in the inner liner 41 of the body 11. The tank thermostat 310 also comprises an operating shaft 315 carrying a contact bridging member 316 controlling a pair of contacts respectively terminating two conductors 317 and 318 arranged in a cable 319, the conductor 317 being connected to the conductor 268 at a junction indicated at 320. The motor speed presetter 330 comprises a variable resistor 331, an associated adjustable contact 332 and a manually operable knob 333 for adjusting the contact 332. In the motor speed presetter 330, the resistor 331 is bridged across the conductor 268 and a conductor 321, and the contact 332 is connected to the conductor 268 and arranged to shortout an adjustable section of the resistor 331. The motor M is connected across the conductor 321 and the bus 236; and the solenoid S2 of the valve 137 is connected across the conductor 268 and the bus 236. Finally, the solenoid S3 of the control valve 150 is bridged across the conductor 318 and the bus 236.

Considering now the mode of operation of the control circuit to govern the operations of the flameless combustion heater 100 and the internal combustion engine 210, operation of the engine 210 is started upon momentary operation of the start pushbutton 233. Such operation of the start pushbutton 233 connects the +bus 237 to the conductor 261 so as to complete a circuit including the stop pushbutton 234 for energizing the winding of the engine relay 240 in order to effect operation thereof. Upon operating, the engine relay 240 closes the contact bridging member 241 to contact the +bus 237 to the conductor 261 independently of the start pushbutton 233; whereby the engine relay 240 is retained operated upon the release of the start pushbutton 233. The connection of power to the conductor 261 completes a circuit including the contact bridging member 231 and its back contacts, and the conductor 263 for energizing the start motor 225; whereby the drive shaft 216 of the engine 210 is rotated. Also, the ignition system 215 is energized between the conductor 261 and the bus 236. Further, the solenoid S1 is energized across the conductor 261 and the bus 236 to open the valve 134. Also, the electric heating units 140 and 141 are energized in series relation across the conductor 261 and the bus 236 via the thermal switch 142. It may be assumed that the supply valve connection 132 is open; whereby opening of the valve 134 effects the supply of liquid propane from the tank 130 into the preheater 122. Heating of the heating unit 141 causes vaporization of the liquid propane in the preheater 122 and the supply thereof via the vapor line 136 to the carburetor 211; whereby operation of the engine 210 is started. Also, heating of the heating unit 140 effects heating of the adjacent portions of the catalytic bed 119, so as to prepare the same for subsequent operation. The engine 210 quickly brings the drive shaft 216 up to normal speed, so that the speed-responsive device 230 responds to actuate its contact bridging members 231 and 232. The contact bridging member 231 opens its back contacts to interrupt the circuit for energizing the start motor 225, and closes its front contacts to connect the generator 220 across the conductor 261 and the bus 236. Also, the contact bridging member 232 connects the conductor 261 to the conductor 265 for a purpose subsequently explained. At this time the voltage regulator 280 is connected across the conductor 261 and the bus 236; whereby it operates to effect the required adjustment of the contact 281 with respect to the resistor 282 so as to set the circuit, including the resistor 282 for energizing the generator field winding 221 across the conductor 261 and the bus 236; so as to cause the generator 220 to generate a voltage that is slightly higher than that of the storage battery 235; with the result that the storage battery 235 is placed "on-charge" across the buses 236 and 237 in a conventional manner.

Closure of the conductor 261 to the conductor 265 effects energization of the heater 246 of the time delay relay 245; whereby, after a suitable time delay, the bimetallic element 247 is actuated to close the switch spring 248, thereby to connect the conductor 265 to the conductor 267, so as to energize the winding of the burner relay 250 across the conductor 267 and the bus 236. The burner relay 250 operates so that the contact bridging member 251 closes the conductor 265 to the conductor 268. The delay thus interposed by the time delay relay 245 allows the engine 210 a short time interval of operation to reach a steady state condition prior to initiating operation of the flameless combustion heater 100; as explained below. Closure of the conductor 268 completes an obvious circuit for energizing the solenoid S2 so that the valve 137 is opened to connect the vapor line 136 to the pipe 110, thereby to supply vaporized propane from the preheater 122 to the aspirator 109. Also, a circuit is completed for energizing the motor M via the resistor 331 of the motor speed presetter 330 and across the conductor 268 and the bus 236. Thus, the motor M runs at the speed preset by the motor speed presetter 330; whereby the blower 115 is operated at a corresponding speed, so that the flameless combustion heater 100 is operated to produce heat at a corresponding rate in the manner previously explained.

The further operation of the heating system depends upon the position of the tank thermostat 310 and specifically whether the tank thermostat 310 occupies its satisfied-position illustrated in FIG. 7 or a heat-demand position. Assuming that the liquid lading 83 contained in the inner liner 41 of the body 11 has a temperature below that preset by the manual dial 312 of the tank thermostat 310, the tank thermostat 310 is governed so as to lift its operating shaft 315 in order to cause the contact bridging member 316 to bridge the associated front contacts so as to connect together the conductors 317 and 318 in the cable 319, with the result that a circuit is completed for energizing the solenoid S3 of the control valve 150, in order to effect operation of the vale gate 154 from its down position, illustrated in FIG. 5, into its up position. As previously explained, the valve gate 154 normally occupies its down position, as illustrated in FIG. 5, so as to cause the hot flue gases to be delivered by the blower 115 through the control valve 150 to the stack 156 and thence to the atmosphere.

Accordingly, when the valve gate 154 is operated into its up position, the hot flue gases are circulated through the passage 82a, 82b in the body 11, so as to bring about useful heating of the liquid lading 83 contained in the inner liner 41 of the body 11. Also, of course, a certain proportion of the flue gases are bypassed from the blower 115 through the control valve 150 into the stack 156 and thence into the atmosphere, as previously explained.

This condition of the heating system is maintained until the temperature of the liquid lading 83 contained in the inner liner 41 of the body 11 is elevated to the desired temperature as preset by the manual dial 312 of the tank thermostat 310, whereupon a satisfied condition of the tank thermostat 310 is realized, with the result that the operating shaft 315 is operated back into its normal down position, causing the contact bridging member 316 to open the connection between the conductor 317 and 318 in the cable 319, with the result that the circuit for energizing the solenoid S3 of the control valve 150 is interrupted.

The valve gate 154 is then restored into its down position, as shown in FIG. 5, by the action of the coil spring 159, so that the hot flue gases from the blower 150 are again diverted into the stack 156 and delivered to the atmosphere, no circulation of the flue gases through the conduits 61 and 71 extending to the body 11 taking place at this time, since the tank thermostat occupies a satisfied condition.

Still subsequently, when the temperature of the liquid lading 83 contained in the inner liner 41 of the body 11 subsides, the tank thermostat 310 is again operated into its demand position in order again to recycle the heating unit, in the manner explained above.

At any time the operation of the engine 210 and the heating system, as well as operation of the flameless combustion heater 100, may be arrested by momentary operation of the stop pushbutton 234. Such operation of the stop pushbutton 234 interrupts the circuit for energizing the winding of the engine relay 240, so as to cause it to restore. Upon restoring, the engine relay 240 interrupts at the contact bridging member 241 the connection between the +bus 237 and the conductor 261, and interrupts at the contact bridging member 242 the connection between the conductor 269 and the conductor 264, the conductor 269 extending to one terminal of the generator 240; whereby the conductor 261 is thus isolated from power. This removal of potential from the conductor 261 effects the removal of potential from the conductors 265 and 268. Of course, the solenoid S1 is deenergized to effect the return of the valve 134 into its closed position, and the solenoid S2 is deenergized to effect the return of the valve 137 into its closed position. The ignition system 215 of the engine 210 is interrupted. The burner relay 250 restores; the solenoid S3, if energized, is deenergized to cause the valve gate 154 in the control valve 150 to be returned to its down position; the motor M is stopped; the heating units 140 and 141 are deenergized; and the time delay relay 245 is restored.

Again referring to FIG. 1, it is noted that the heater 100 together with the other major components of the heating system, are arranged in the housing 92 so as to be protected from exposure to the weather; which components are accessible for adjustment and repair, when the side door 93 occupies its open position. In the arrangement, the air intake conduit 101 and the stack 156 project through the top wall of the housing 92 and are arranged on communication with the atmosphere. The conduits 157 and 172 project through the rear wall of the housing 192 and are respectively connected exteriorly of the housing 92 to the two conduits 61 and 71, as previously explained. Of course, the blower 115, the motor M, the control valve 150, the internal combustion engine 210 and the other fundamental electrical components of the control system are also arranged within the housing 92. As indicated, the air intake pipe 212 extending to the carburetor 211 and the exhaust pipe 214 extending from the internal combustion engine 210 also extend through the top wall of the housing 92 into communication with the atmosphere.

The fuel tank 130 is suitably secured to the bottom of the outer shell 21 of the body 11 inwardly of the adjacent stub draft sill 16a; and the propane line 133 extends from the fuel tank 130 to the solenoid valve 134 that is also arranged within the housing 92. Further, a casing 95 is carried by the lower side portion of the outer shell 21 of the body 11 somewhat inwardly of the adjacent stub draft sill 16b; which casing 95 is provided with a side door 96. Arranged in the casing 95 is the tank thermostat 310; and the contacts governed by the contact bridging member 316 of the tank thermostat 310 are connected by the weatherproof cable 319 to the solenoid S3 of the control valve 150 that is also arranged within the housing 92. Accordingly, all of the electrical components of the control system for the heating system are housed in waterproof equipment so as to prevent exposure thereof to the elements of weather.

The present application, the Gutzeit Patent Nos. 3,253,641 and 3,291,199, the Graves application, Ser. No. 325,884, and the Budininkas application, Ser. No. 307,805, all discussed above, are assigned to the common assignee, General American Transportation Corporation.

In view of the foregoing, it is apparent that there has been provided an improved heating system that incorporated a flameless combustion heater and also an improved railway tank car that is provided with a heating system utilizing the flameless combustion heater. Also, there has been provided an improved and simplified control arrangement for the heating system so as to govern the operation thereof in accordance with the requirements of the liquid lading contained in the inner liner of the tank body. Finally, there has been provided in a railway tank car, a heat-insulated body incorporating an improved and simplified heating system for conducting a heating fluid into heat-exchange relation with the liquid lading contained in the inner liner of the body.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A railway tank car comprising a mobile frame, heat-insulated tank structure carried by said frame and adapted to contain a liquid lading that is to be maintained in a hot condition, a heating conduit carried by said tank structure and arranged to be in good heat-exchange reaction with the lading contained therein, a flameless combustion heater carried by said frame and including a porous catalytic bed, means carried by said frame for supplying a combustible mixture in the gas phase into the catalytic bed of said heater, the catalytic bed of said heater being characterized by producing flameless catalytic combustion therein of the combustible mixture supplied thereto and the consequent production and discharge therefrom of hot flue gases, and means carried by said frame for conducting through said heating conduit the hot flue gases discharged from the catalytic bed of said heater, thereby to maintain the hot condition of the liquid lading contained in said tank structure.

2. A railway tank car comprising a mobile frame, heat-insulated tank structure carried by said frame and adapted to contain a liquid lading that is to be maintained in a hot condition, a heating conduit carried by said tank structure and arranged to be in good heat-exchange relation with the lading contained therein, said heating conduit having an inlet and an outlet, a tube carried by said frame and having an adit and an exit, the adit of said tube communicating with the atmosphere, a blower carried by said frame and having an inlet and an outlet, the exit of said tube being connected to the inlet of said blower, whereby operation of said blower draws an air stream through said tube, means carried by said frame for operating said blower, an injector carried by said frame and operatively associated with an upstream section of said tube and operative to inject into the air stream passing therethrough a combustible substance in order to produce a combustible mixture in the gas phase, means carried by said frame for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a stack carried by said frame and having an adit and an exit, the exit of said stack communicating with the atmosphere, and a conduit system carried by said frame and interconnecting the outlet of said blower and the inlet of said heating conduit and the inlet of said stack and the outlet of said heating conduit and the inlet of said blower, whereby operation of said blower also produces circulation of the hot flue gases from said blower via said conduit system and through said heating conduit and back to said blower and further forces a part of the circulated hot flue gases from said blower via said conduit system and through said stack to the atmosphere, thereby to maintain the hot condition of the liquid contained in said tank structure.

3. A railway tank car comprising a mobile frame, heat-insulated tank structure carried by said frame and adapted to contain a liquid lading that is to be maintained in a hot condition, a flameless combustion heater carried by said frame and including a porous catalytic bed, means carried by said frame for supplying a combustible mixture in the gas phase into the catalytic bed of said heater, the catalytic bed of said heater being characterized by producing flameless catalytic combustion of the combustible mixture supplied thereto and the consequent production therein of hot flue gases, conduit means carried by said frame for discharging to the atmosphere the hot flue gases produced in said catalytic bed, and heat-exchange means carried by said frame for transferring heat from the hot flue gases discharged by said conduit means to the liquid lading contained in said tank structure, thereby to maintain the hot condition of the liquid lading contained in said tank structure.

4. A heating system comprising a tube having an adit and an exit, the adit of said tube communicating with the atmosphere, a blower having an inlet and an outlet, the exit of said tube being connected to the inlet of said blower, whereby operation of said blower draws an air stream through said tube, means for operating said blower, an injector operatively associated with an upstream section of said tube and operative to inject into the air stream passing therethrough a combustible substance in order to produce a combustible mixture in the gas phase, means for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a heating device having an inlet and an outlet, a first conduit having an adit connected to the outlet of said blower and an exit connected to the inlet of said heating device, a second conduit having an adit connected to the outlet of said heating device and an exit also connected to the inlet of said blower, whereby operation of said blower also circulates a current of the hot flue gases from said blower via said first conduit and through said heating device and via said second conduit and back into said blower, thereby to effect useful heating of said heating device, and a stack having an adit connected to an intermediate section of one of said conduits and an exit communicating with the atmosphere, whereby operation of said blower further exhausts a part of the circulated current of hot flue gases from said one conduit through said stack to the atmosphere.

5. A heating system comprising a tube having an adit and an exit, the adit of said tube communicating with the atmosphere, a blower having an inlet and an outlet, the exit of said tube being connected to the inlet of said blower, whereby operation of said blower draws an air stream through said tube, means for operating said blower, an injector operatively associated with an upstream section of said tube and operative to inject into the air stream passing therethrough a combustible substance in order to produce a combustible mixture in the gas phase, means for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a control valve having an inlet and two outlets and mechanism for controlling the connection of said valve inlet to said two valve outlets, the outlet of said blower being connected to said valve inlet, a heating device having an inlet and an outlet, a first conduit having an adit connected to one of said valve outlets and an exit connected to the inlet of said heating device, a second conduit having an outlet connected to the outlet of said heating device and an exit also connected to the inlet of said blower, whereby operation of said blower may also circulate a current of the hot flue gases from said blower via said valve inlet and said one valve outlet and said first conduit and through said heating device and via said second conduit and back into said blower, thereby to effect useful heating of said heating device, a stack having an adit connected to the other of said valve outlets and an exit communicating with the atmosphere, whereby operation of said blower may further exhaust a part of the circulated current of hot flue gases from said blower via said valve inlet and said other valve outlet and through said stack to the atmosphere, and means for selectively governing said valve mechanism.

6. The heating system set forth in claim 5, wherein said valve mechanism is selectively operative between a first position closing said valve inlet to said one valve outlet and opening said valve inlet to said other valve outlet and a second position opening said valve inlet to both of said valve outlets.

7. A heating system comprising a tube having an adit and an exit, the adit of said tube communicating with the atmosphere, a blower having an inlet and an outlet, the exit of said tube being connected to the inlet of said blower, whereby operation of said blower draws an air stream through said tube, means for operating said blower, an injector operatively associated with an upstream section of said tube and operative to inject into the air stream passing therethrough a combustible substance in order to produce a combustible mixture in the gas phase, means for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a control valve having an inlet and two outlets and mechanism for controlling the connection of said valve inlet to said two valve outlets, said valve mechanism having a first position closing said valve inlet to one of said valve outlets and opening said valve inlet to the other of said valve outlets and a second position opening said valve inlet to both of said valve outlets, the outlet of said blower being connected to said valve inlet, a heating device having an inlet and an outlet, a first conduit having an adit connected to said one valve outlet and an exit connected to the inlet of said heating device, a second conduit having an outlet connected to the outlet of said heating device and an exit also connected to the inlet of said blower, a stack having an adit connected to said other valve outlet and an exit communicating with the atmosphere, whereby operation of said blower when said valve mechanism occupies its first position forces all of the hot flue gases therefrom via said valve inlet and said other valve outlet and through said stack to the atmosphere, whereby operation of said blower when said valve mechanism occupies its second position circulates a current of the hot flue gases from said blower via said valve inlet and said one valve outlet and said first conduit and through said heating device and via said second conduit and back to said blower and also exhausts a part of the hot flue gases from said blower via said valve inlet and said other valve outlet and through said stack to the atmosphere, thereby to effect useful heating of said heating device, a thermostat operatively associated with a medium heated by said heating device and responsive to the temperature of the medium and selectively operative between a satisfied position when elevation of the temperature of the medium is not required and a demand position when elevation of the temperature of the medium is required, and means governed by said thermostat in its satisfied position for operating said valve mechanism into its first position and governed by said thermostat in its demand position for operating said valve mechanism into its second position.

8. A railway tank car comprising a mobile frame, heat-insulated tank structure carried by said frame and adapted to contain a liquid lading that is to be maintained in a hot condition, a tube carried by said frame and having an adit and an exit, the adit of said tube communicating with the atmosphere, a blower carried by said frame and having an inlet and an outlet, the exit of said tube being connected to inlet of said blower, whereby operation of said blower draws an air stream through said tube, means carried by said frame for operating said blower, an injector carried by said frame and operatively associated with an upstream section of said tube and operative to inject into the air stream passing therethrough a combustible substance in order to produce a combustible mixture in the gas phase, means carried by said frame for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a conduit system carried by said frame and having an adit connected to the outlet of said blower and an exit communicating with the atmosphere, whereby operation of said blower also discharges the hot flue gases produced in said catalytic bed via said conduit system to the atmosphere, and heat-exchange means carried by said frame for transferring heat from the hot flue gases discharged via said conduit system to the liquid lading contained in said tank structure, thereby to maintain the hot condition of the liquid lading contained in said tank structure.

9. A railway tank car comprising a mobile frame, heat-insulated tank structure carried by said frame and adapted to contain a liquid lading that is to be maintained in a hot condition, a tube carried by said frame and having an adit and an exit, the adit of said tube communicating with the atmosphere, a blower carried by said frame and having an inlet and an outlet, the exit of said tube being connected to inlet of said blower, whereby operation of said blower draws an air stream through said tube, means carried by said frame for operating said blower, an aspirator carried by said frame and operatively associated with an upstream section of said tube and responsive to the passage of the air stream therethrough to inject into the air stream passing therethrough gaseous fuel in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, a conduit system carried by said frame and having an adit connected to the outlet of said blower and an exit communicating with the atmosphere, whereby operation of said blower also discharges the hot flue gases produced in said catalytic bed via said conduit system to the atmosphere, and heat-exchange means carried by said frame for transferring heat from the hot flue gases discharged via said conduit system to the liquid lading contained in said tank structure, thereby to maintain the hot condition of the liquid lading contained in said tank structure.

10. A railway tank car comprising a mobile frame, heat-insulated tank structure carried by said frame and adapted to contain a liquid lading that is to be maintained in a hot condition, a tube carried by said frame and having an adit and an exit, the adit of said tube communicating with the atmosphere, a blower carried by said frame and having an inlet and an outlet, the exit of said tube being connected to inlet of said blower, whereby operation of said blower draws an air stream through said tube, means carried by said frame for operating said blower, an injector carried by said frame and operatively associated with an upstream section of said tube and operative to inject into the air stream passing therethrough a vaporized liquid fuel supplied thereto in order to produce a combustible mixture in the gas phase, means carried by said frame for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a preheater carried by said frame and operative to vaporize liquid fuel supplied thereto and to supply the vaporized fuel to said injector, means carried by said frame for operating said preheater, a fuel tank carried by said frame and adapted to contain liquid fuel and arranged to supply the liquid fuel to said preheater, a conduit system carried by said frame and having an adit connected to the outlet of said blower and an exit communication with the atmosphere, whereby operation of said blower also discharges the hot flue gases produced in said catalytic bed via said conduit system to the atmosphere, and heat-exchange means carried by said frame for transferring heat from the hot flue gases discharged via said conduit system to the liquid lading contained in said tank structure, thereby to maintain the hot condition of the liquid lading contained in said tank structure.

11. A railway tank car comprising a mobile frame, heat-insulated tank structure carried by said frame and adapted to contain a liquid lading that is to be maintained in a hot condition, a tube carried by said frame and having an adit and an exit, the adit of said tube communicating with the atmosphere, a blower carried by said frame and having an inlet and an outlet, the exit of said tube being connected to inlet of said blower, whereby operation of said blower draws an air stream through said tube, an electric motor carried by said frame for operating said blower, an electric generator carried by said fame for operating said electric motor, an internal combustion engine carried by said frame for operating said electric generator, an injector carried by said frame and operatively associated with an upstream section of said tube and operative to inject into the air stream passing therethrough a combustible substance in order to produce a combustible mixture in the gas phase, means carried by said frame for operating said injector, a porous catalytic bed arranged in a downstream section of said tube and accommodating the ready passage therethrough of the combustible mixture in the gas phase and characterized by producing flameless catalytic combustion thereof in order to produce hot flue gases, a conduit system carried by said frame and having an adit connected to the outlet of said blower and an exit communicating with the atmosphere, whereby operation of said blower also discharges the hot flue gases produced in said catalytic bed via said conduit system to the atmosphere, and heat-exchange means carried by said frame for transferring heat from the hot flue gases discharged via said conduit system to the liquid lading contained in said tank structure, thereby to maintain the hot condition of the liquid lading contained in said tank structure.

12. The railway tank car set forth in claim 11, and further comprising a weather-proof housing carried by said frame and enclosing said upstream section of said tube and said downstream section of said tube and said blower and electric motor and said electric generator and said internal combustion engine and said injector.

13. The railway tank car set forth in claim 1; wherein said heat-insulated tank structure includes a metal outer shell, an intermediate layer of resilient cellular material completely enclosed by said outer shell, and a metal inner liner completely enclosed by said intermediate layer, said intermediate layer substantially completely filling the space between said outer shell and said inner liner and having a substantial thickness in order completely to separate and to isolate said outer shell from said inner liner and resiliently to support said inner liner from said outer shell, said inner liner being adapted to contain the liquid lading that is to be maintained at a desired temperature, said intermediate layer having a low K-factor in order to heat-insulate said inner liner from said outer shell; and wherein said heating conduit includes tubular structure arranged in the space between said outer shell and said inner liner and disposed in contact with the outer surface of said inner liner and in good heat-exchange relation therewith and disposed in inwardly spaced-apart relation with said outer shell and also embedded in said intermediate layer, whereby said tubular structure is also heat-insulated from said outer shell by said intermediate layer, and two tubular conduit elements respectively extending from the outside of said outer shell into communication at the inner ends thereof with said tubular structure, said conduit elements respectively extending through two sets of openings respectively formed in said outer shell and in said intermediate layer and the inner ends of said conduit elements being respectively sealed in fluid-tight relation with said tubular structure, whereby said conduit elements accommodate the circulation therethrough of the hot flue gases from the outside through said tubular structure and back to the outside, so as to maintain the desired temperature of the liquid lading contained in said inner liner.

14. The railway tank car set forth in claim 13, wherein said intermediate layer consists essentially of a blown polyester-urethane resin of closed-cell structure entrapping substantial inert gas, and wherein said inert gas consists essentially of a chlorine-fluorine substituted alkane, whereby said intermediate layer has a K-factor at least as low as about 0.15 B.tu./in./sq. ft./hr./° F.

15. The railway tank car set forth in claim 1; wherein said heat-insulated tank structure includes a metal outer shell, an intermediate layer of resilient cellular material completely enclosed by said outer shell, and a metal inner liner completely enclosed by said intermediate layer, said intermediate layer substantially completely filling the space between said outer shell and said inner liner and having a substantial thickness in order completely to separate and to isolate said outer shell from said inner liner and resiliently to support said inner liner from said outer shell, said inner liner being adapted to contain the liquid lading that is to be maintained at a desired temperature, said intermediate layer having a low K-factor in order to heat-insulate said inner liner from said outer shell; and wherein said heating conduit includes two tubular conduit elements respectively extending from the outside of said outer shell into the interior of said inner liner, said conduit elements respectively extending through sets of aligned openings respectivley formed in said outer shell and in said intermediate layer and in said inner liner and being arranged so that the inner ends thereof are submerged in the liquid lading contained in said inner liner, said inner liner being sealed to the portions of said conduit elements projecting through the openings therein to prevent leakage therethrough of the liquid lading contained in said inner liner, and tubular structure interconnecting the inner ends of said conduit elements, whereby said conduit elements accommodate the circulation therethrough of the hot flue gases from the outside through said tubular structure and back to the outside, so as to maintain the desired temperature of the liquid lading contained in said inner liner.

16. The railway tank car set forth in claim 15, wherein said intermediate layer consists essentially of a blown polyester-urethane resin of closed-cell structure entrapping substantial inert gas, and wherein said inert gas consists essentially of a chlorine-fluorine substituted alkane, whereby said intermediate layer has a K-factor at least as low as about 0.15 B.t.u./in./sq. ft./hr./° F.

References Cited

UNITED STATES PATENTS

| | | | |
|---|---|---|---|
| 1,156,829 | 10/1915 | Weiss | 165—41 |
| 1,222,741 | 4/1917 | Doherty | 263—1 |
| 1,498,266 | 6/1924 | Graumann | 158—1 |
| 1,755,176 | 4/1930 | Feldmeir | 220—9 |
| 1,921,806 | 8/1933 | Carlson | 165—136 |
| 1,938,625 | 12/1933 | Engels | 107—55 |
| 2,098,210 | 11/1937 | Schulse | 165—136 |
| 2,795,054 | 6/1957 | Bowen | 34—35 |
| 2,808,048 | 10/1957 | Garrison | 126—343.5 |
| 3,058,925 | 10/1962 | Robitschek | 260—2.5 |
| 3,139,842 | 7/1964 | Moyes et al. | 105—360 |
| 3,143,108 | 8/1964 | Rogers | 126—343.5 |
| 3,163,434 | 12/1964 | Krueger | 296—31 X |
| 3,163,435 | 12/1964 | Krueger et al. | 296—31 X |
| 3,175,606 | 3/1965 | Talmey et al. | 165—41 |
| 3,214,392 | 10/1965 | Worsley | 260—2.5 |
| 3,253,641 | 5/1966 | Gutzeit | 158—96 X |

FOREIGN PATENTS 716,175    10/1931    France.

FREDERICK KETTERER, *Primary Examiner.*